(12) United States Patent
Michi et al.

(10) Patent No.: US 6,230,093 B1
(45) Date of Patent: May 8, 2001

(54) METHOD AND DEVICE FOR DETERMINING THE PROBABLE PATH TO BE COVERED BY A VEHICLE

(75) Inventors: Harald Michi, Ölbronn-Dürrn; Hermann Winner, Karlsruhe; Bernd Lichtenberg, Bietigheim-Bissingen; Werner Uhler, Bruchsal, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/424,733

(22) PCT Filed: Feb. 21, 1998

(86) PCT No.: PCT/DE98/00543

§ 371 Date: Mar. 2, 2000

§ 102(e) Date: Mar. 2, 2000

(87) PCT Pub. No.: WO98/54594

PCT Pub. Date: Dec. 3, 1998

(30) Foreign Application Priority Data

May 31, 1997 (DE) .............................................. 197 22 947

(51) Int. Cl.$^7$ ..................................................... G06F 17/00
(52) U.S. Cl. ............................ 701/96; 180/167; 340/435; 340/903
(58) Field of Search ................................ 701/93, 96, 300, 701/301; 180/167, 169, 271; 340/435, 436, 901, 903, 904; 342/70, 456, 455

(56) References Cited

U.S. PATENT DOCUMENTS

| | | | |
|---|---|---|---|
| 4,632,543 | 12/1986 | Endo | 356/5.08 |
| 4,757,450 | 7/1988 | Etoh | 701/96 |
| 4,786,164 | 11/1988 | Kawata | 356/5.05 |
| 5,177,462 | 1/1993 | Kajiwara | 340/435 |
| 5,467,283 * | 11/1995 | Butsuen et al. | 701/301 |
| 5,510,990 | 4/1996 | Hibino et al. | 701/96 |
| 5,629,851 * | 5/1997 | Williams et al. | 701/96 |

FOREIGN PATENT DOCUMENTS 196 14 061   10/1996   (DE) .

OTHER PUBLICATIONS

Winner et al. "Adaptive Cruise Control—System Aspects and Developments Trends" Feb. 26–29, 1996, SAE Technical Paper Series No. 961010.

* cited by examiner

Primary Examiner—William A. Cuchlinski, Jr.
Assistant Examiner—Edward Pipala
(74) Attorney, Agent, or Firm—Kenyon & Kenyon

(57) ABSTRACT

A method and a device for determining a future travel-course progression or travel-course range of a vehicle whose traveling speed is controllable as a function of a distance to preceding-traveling vehicles, the future course range being determined at least on the basis of a course progression of one preceding-traveling vehicle. Moreover, a lateral offset is determined for all detected preceding-traveling vehicles. The determined future course range is limited on the basis of detected stationary objects.

7 Claims, 5 Drawing Sheets

METHOD AND DEVICE FOR DETERMINING THE PROBABLE PATH TO BE COVERED BY A VEHICLE

The present invention relates to a method and a device for determining a future travel-course range of a motor vehicle. For example, it can be used within the framework of an adaptive cruise control or proximity control of a vehicle, an adaptive headlight-leveling adjustment, or even simply for detecting critical situations. It is assumed that the vehicle is equipped with at least one sensor which is able to detect vehicles traveling in front and stationary objects in the forefield of the vehicle, and at least determine their position. Such sensors can be constructed, for example, as radar-, laser-, or even as video sensors. The present invention is preferably used in conjunction with an adaptive cruise control or proximity control of a vehicle, since such a sensor is already provided for this application.

BACKGROUND INFORMATION

Numerous publications deal with an automatic control of the speed of a motor vehicle, taking into consideration the distance to vehicles in front. Such systems are frequently designated as adaptive cruise control (ACC), or in German as adaptive or dynamic traveling-speed controllers. In view of today's traffic conditions, a basic problem in such systems is an automatic decision as to which of several preceding-traveling vehicles is relevant or the most relevant for the cruise or proximity control. This decision is particularly difficult when the road upon which the controlled vehicle is moving is multi-lane and curvy. In this case, a proximity sensor which, inter alia, is used for detecting vehicles in front, generally also detects vehicles that are located on adjacent traffic lanes and therefore have only secondary relevance for a proximity control.

Accordingly, there is a need in an ACC system to determine a future travel-course progression or a future travel-course range of the controlled vehicle in order to ascertain in each case the most relevant vehicle in front or, conversely, the most dangerous obstacle at an instantaneous point of time based on the knowledge of this range. Both variables—the course progression and the course range—are basically oriented to the run of the road, but in the optimum case, also take into account lane-change or turning operations of the controlled vehicle possibly taking place. In this context, the term "future course range" differs in the following from the term "future course progression" to the effect that it includes the entire spatial range in which the controlled vehicle will probably move. This means that it also takes into account the breadth necessary for the motor vehicle in each case.

Presently known solutions to the problem formulation indicated above are described, for example, in the publication "Adaptive Cruise Control—System Aspects and Development Trends" by Winner, Witte et al., published as SAE Technical Paper Series No. 961010 at the SAE of Feb. 26–29, 1996. According to that, the easiest way of predicting a future course of a controlled vehicle is to assume a linear movement. However, it is obvious that this type of predicting will not function in the case of curves or lane changes. A more complex case, which, however, furnishes adequate results for wide ranges, is the assumption of a course having a constant curve. This is determined, for example, from a difference of wheel speeds, from a steering angle or steering-wheel angle, from transverse accelerations and/or from yaw rates. Corresponding methods are known from the field of operating-dynamics control. The disadvantage of this method is that, in each case, the future course or course range is estimated only on the basis of the current course. Thus, errors arise here as well in response to each change of the course, such as when driving into or out of curves. A further possibility for predicting a course progression, which is likewise mentioned in the publication indicated, is the use of navigation systems. However, the limits of this method depend upon how up-to-date and accurate the available maps are, as well as the ability of the system to determine the current position of the vehicle. The prediction is faulty particularly in construction-site areas or in the case of new roads. Another possibility indicated in the aforesaid publication is a prediction of the road progression or of the lane based on radar data. Stationary objects such as reflectors or crash barriers, which are detected by a signal processor, are used to reconstruct the road boundaries. However, according to the publication, little is known at this point about the quality and reliability of this method.

U.S. Pat. No. 4,786,164 describes a system and a method for detecting a distance between two vehicles moving in the same traffic lane. The traffic lane in which each of the two vehicles is moving is determined on the basis of a comparison of angles at which reflectors, which are distributed at both sides of the road, are detected. However, the method described in that case is applicable only if suitable reflectors are actually available on both sides of a road, and thus is dependent upon infrastructure conditions.

German Patent No.196 14061 describes a system for controlling the distance to a vehicle in front on the basis of an adjustable probability distribution. This described system has a curve-determination device, in which the curve of a road is determined on the basis of a steering angle and a vehicular speed. To improve reliability, according to a first modification, the steering angle is ascertained on the basis of the movement of a specified stationary object. To that end, the locations of a stationary object relative to a moving system vehicle are monitored at uniform time intervals. The locations are then defined as circular arcs in order to calculate the curve of the road upon which the system vehicle is traveling. According to a second modification, a sharp curve of the road can likewise be detected with reference to a stationary object. According to a fourth modification, the calculated curve can be increased or reduced when a turn indicator indicates the right or the left direction. According to a tenth modification, with the aid of a navigation system such as a GPS system, it is possible to determine whether or not a curve exists in a forward direction of the system vehicle. However, none of the methods put forward in this patent eliminates the disadvantages already indicated in detail.

SUMMARY OF THE INVENTION

An object of the present invention is to specify a method and a device based thereon which make it possible to reliably determine a future travel-course range of a first vehicle, and particularly when driving into and out of curves, as well.

This objective is achieved according to the present invention in that the future course range of the first vehicle is determined at least with reference to a course progression of a vehicle in front. To that end, according to a preferred embodiment of the present invention, a relative position of at least one preceding-traveling vehicle with respect to the first vehicle is determined, and subsequently a lateral offset q between the vehicle in front and the first vehicle is determined based on this relative position. The future course range of the controlled vehicle is then determined as a function of the lateral offset q and of the course progression of the vehicle in front. Concretely stated, the movement of one or more preceding-traveling vehicles is observed to ascertain the future course progression or course range of the controlled vehicle. Lateral offset q is advantageously re-determined at fixed or selectable points of time, and is assumed to be constant between these points of time. It is particularly advantageous if the future course range of the controlled vehicle is determined on the basis of course progressions of a plurality of preceding-traveling vehicles, a lane change of a single preceding-traveling vehicle being isolated by comparison or correlation or average of the course progressions of all preceding-traveling vehicles, according to a particularly preferred refinement of the present invention, in addition to the first future course range determined according to the present invention, at least one further future course range is ascertained on the basis of a steering angle, a steering-wheel angle, a yaw rate, a difference of wheel speeds, or a transverse acceleration of the controlled vehicle, or with reference to stationary objects, or on the basis of oncoming vehicles which are detected by the proximity sensor of the first vehicle. A verified future course range is then ascertained on the basis of the first and the at least one further determined future course range. Concretely stated, this means that a future course range of the controlled vehicle is determined on the basis of different methods which are independent of one another. By combining these individually determined, future course ranges, it is possible to correct errors occurring individually in the methods, so that the verified future course range includes an optimal prediction of the actual course range. According to a further advantageous refinement of the present invention, the future or the verified future course range is limited on the basis of positions of detected stationary objects, or based on positions of detected oncoming vehicles. In this manner, further independent data flow into the determination of the future course range.

One particular advantage of the method of the present invention is that the future course range is ascertained on the basis of measuring data of situations which actually lie in the forefield of the controlled vehicle. Instead of an estimation by extrapolating an instantaneous situation, an evaluation is made of the situation actually existing in the forefield of the vehicle. In particular, this permits early detection of a beginning or end of a curve. In this manner, the error rate is markedly reduced compared to previously known methods. A further advantage is that the method is independent of special infrastructure conditions such as reflectors provided extra at the edge of the road. However, if appropriate reflectors are present, they can be suitably taken into account as well. In addition, the method can be implemented in a vehicle which is equipped with an adaptive cruise control without special expenditure, in particular without an additional image pick-up and image evaluation device.

DETAILED DESCRIPTION

Figure 1:
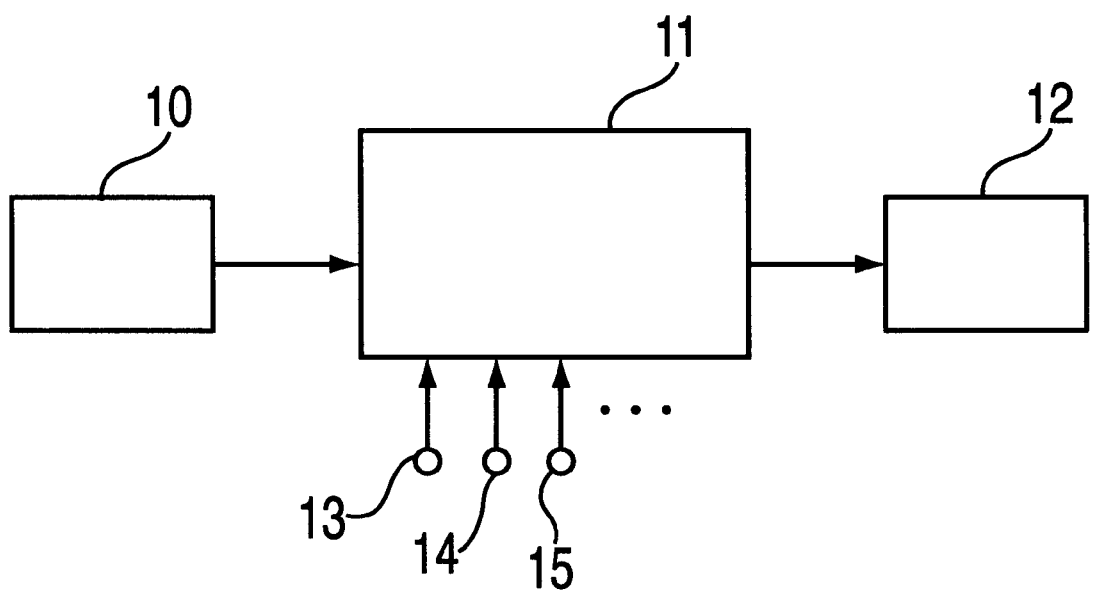
FIG. 1 shows a basic representation of a device according to the present invention.

FIG. 1 shows a device for carrying out the method of the present invention. A proximity sensor 10, such as a radar or laser sensor, is connected to an evaluation and control unit 11. Evaluation and control unit 11 receives numerous further signals, of which an input 13 for a vehicle's own speed, an input 14 for a steering angle and an input 15 for a yaw rate are shown here by way of example. Evaluation and control unit 11 is also connected to one or more actuators 12. The entire device is installed in a first vehicle. According to known methods, proximity sensor 10 is used to detect preceding-traveling vehicles, oncoming vehicles, as well as stationary objects upon and on both sides of the roadway. Corresponding measuring data are prepared and supplied to evaluation and control unit 11. According to the following described method, this unit determines at least one future travel-course range of the first vehicle. Evaluation and control unit 11, by way of actuator(s) 12, controls or regulates the speed of the vehicle within the framework of an adaptive cruise control. Alternatively or in addition, by way of actuators 12, the unit controls, for example, the light level or the light cone of the vehicle headlights, or generates a warning signal indicating a critical situation.

Figure 2:
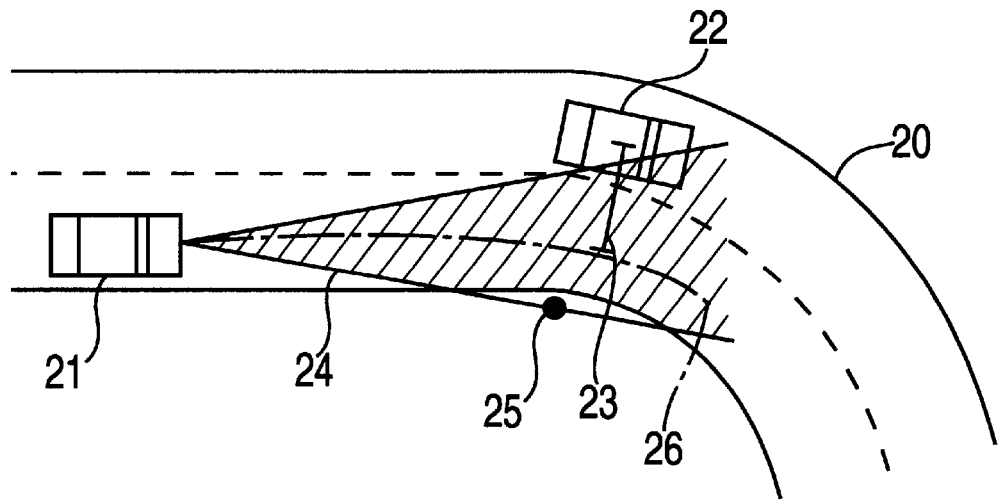
FIG. 2 shows a first diagrammatic sketch to clarify the method of the present invention.

FIG. 2 shows a two-lane road 20, upon which two vehicles 21, 22 are moving in the same direction. Numeral 21 indicates the vehicle having the device of the present invention. Starting from the front of vehicle 21, an angle range 24 is sketched which symbolizes the detecting range of proximity sensor 10. A dot-dash line 26 shows the future course progression of vehicle 21. A line segment 23 indicates a lateral offset q between vehicles 21 and 22. Numeral 25 indicates a stationary object such as a tree at the edge of the road.

Figure 3:
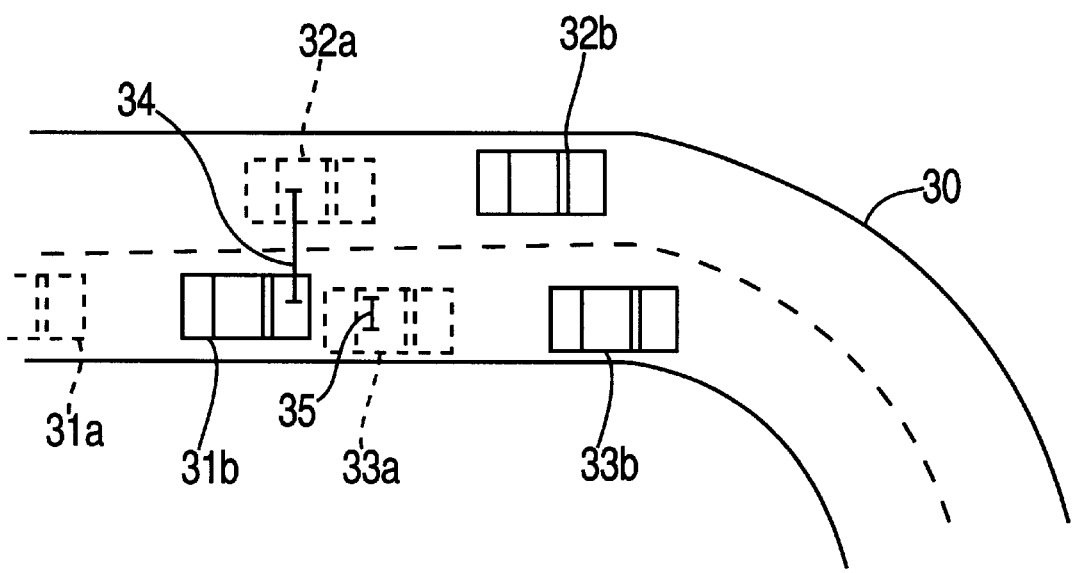
FIG. 3 shows a second diagrammatic sketch to clarify the method of the present invention.

FIG. 3 likewise shows a two-lane road 30, upon which three vehicles 31, 32 and 33 are shown at two different instants $t_0$ and $t_1$. The positions of the vehicles at instant $t_0$ are shown with a dotted line and are designated by 31$a$, 32$a$ and 33$a$. The positions of the vehicles at instant $t_1$ are designated by 31$b$, 32$b$ and 33$b$. Two line segments 34 and 35 designate a lateral offset $q_1$ and $q_2$, respectively, between vehicles 31 and 32 and between vehicles 31 and 33.

Figure 4:
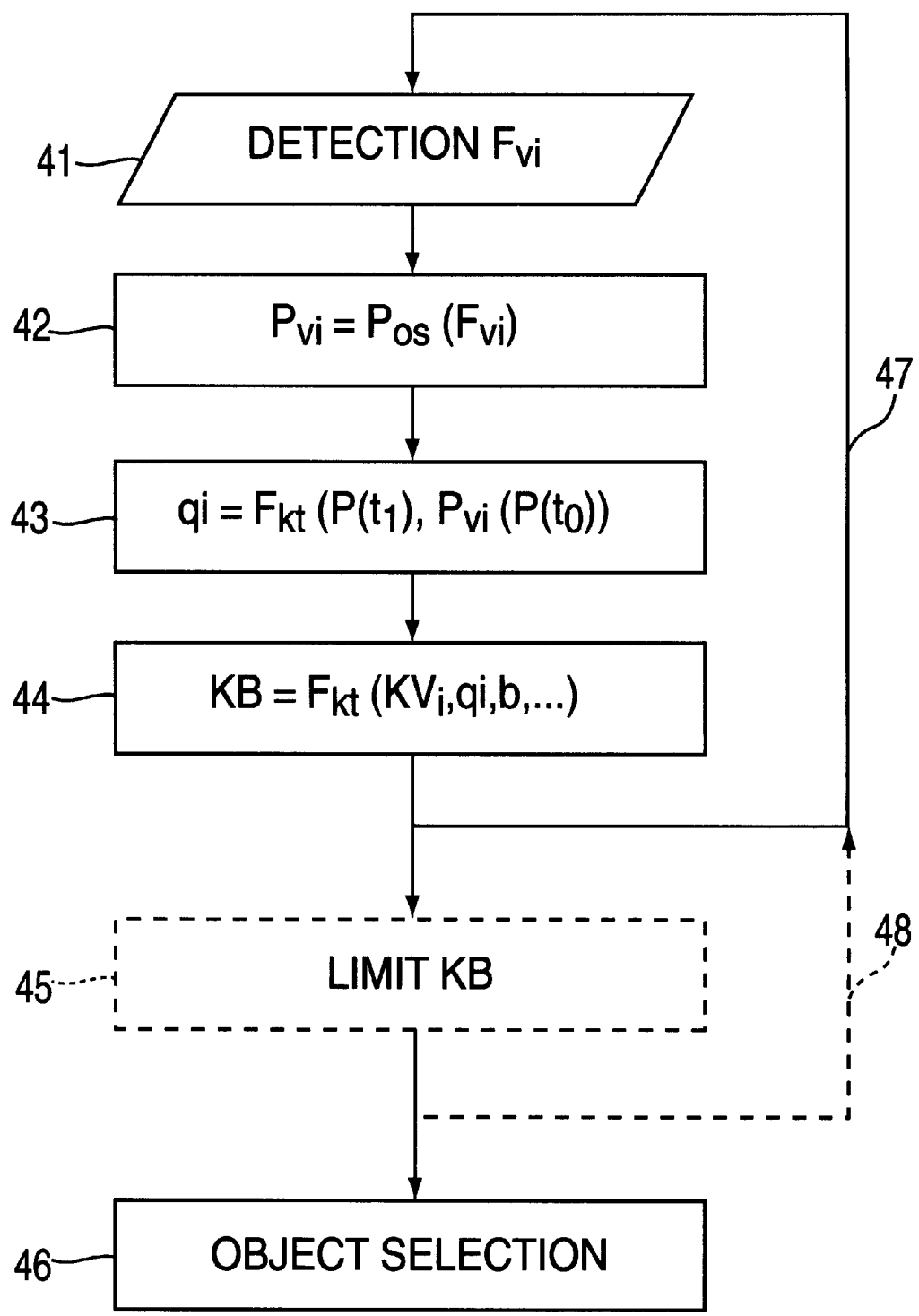
FIG. 4 shows a flow chart according to a first exemplary embodiment of the present invention.

FIG. 4 shows a flow chart of a first exemplary embodiment of the present invention. According to step 41, preceding-traveling vehicles $F_{vi}$ are detected with the aid of proximity sensor 10. In so doing, according to FIG. 2 and FIG. 3, vehicle 22 as well as vehicles 32 and 33 are detected. In step 42, a position $P_{vi}$ of each individual preceding-traveling vehicle is determined. Depending upon the implementation, this step can be carried out either by an evaluation circuit within proximity sensor 10 or by evaluation and control unit 11. The determined positions $P_{vi}$ of preceding-traveling vehicles $F_{vi}$ include a distance $d_i$ and an angle $\alpha_i$. According to step 43, a lateral offset $q_1$, indicated in FIGS. 2 and 3 by line segments 23, 34 and 35, is ascertained. Purely mathematically, lateral offset $q_1$ is expressed as $$q_1 = d_i * \sin \alpha_i.$$

However, since the curve of roads 20 and 30, respectively, and an additional lateral offset of vehicles $F_{vi}$ resulting from this are not allowed for in this equation, it is more advantageous to ascertain the respective lateral offset $q_1$ based on position P of vehicle 31 at instant $t_1$ and position $P_{vi}$ of preceding-traveling vehicles 32, 33 at instant $t_0$. In other words, in this context, lateral offset $q_1$ is first determined in each case when first vehicle 31 is located at or next to the position which the respective preceding-traveling vehicle held one or more measuring instants previously.

According to step 44, future course range KB of controlled vehicle 21, 31 is now determined on the basis of an assumed width b of the first vehicle, with reference to course progressions $KV_i$ of preceding-traveling vehicles $F_{vi}$, with reference to their respective lateral offset $q_1$ and, optionally, with reference to previously determined course progressions. This is based on the assumption that the first vehicle will continue to move like the vehicle(s) in front. If an intended or beginning lane change by the vehicle is detected, for example as a function of a blinker signal, the determined probable course range is advantageously expanded in the corresponding direction. This differentiates the ascertained future course range KB from a pure forecast of the road progression. According to 47, future course range KB of the first vehicle is ascertained iteratively, i.e., a new determination cycle follows here. According to step 45, a preferred refinement of the present invention provides for limiting the determined future course range on the basis of stationary objects 25 and, in so far as present, with reference to detected oncoming vehicles $F_G$ which are not shown in FIGS. 2 and 3.

The following step 46 relates to the use of the method according to the present invention within the framework of an adaptive travel speed and proximity control. At this point, a vehicle in front is selected as a control object for the proximity control. In so doing, advantageously only those vehicles in front are now taken into account which are located within the determined future course range KB. If a plurality of preceding-traveling vehicles are located in this range, a selection is preferably made according to which of the preceding-traveling vehicles requires a lowest setpoint acceleration or a greatest setpoint deceleration for the controlled vehicle. However, the selection can also be made alternatively or additionally as a function of different criteria. For example, the selection can be made according to which of the preceding-traveling vehicles exhibits the smallest distance to the first controlled vehicle. Numeral 48 represents the iterative repetition of the method according to the preferred embodiment of the present invention.

Figure 5:
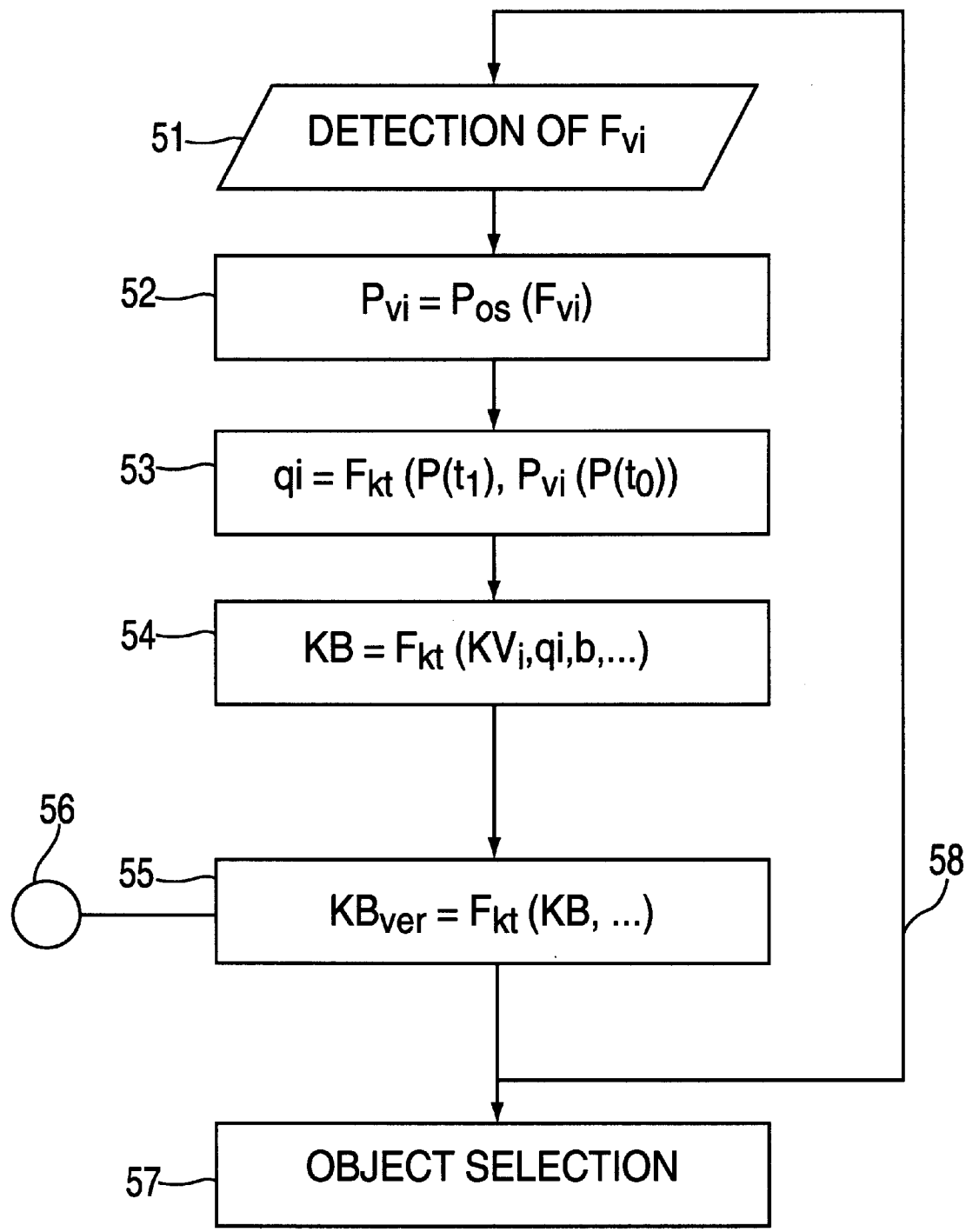
FIG. 5 shows a flow chart according to a second exemplary embodiment of the present invention.

FIG. 5 shows a flow chart of a second exemplary embodiment of the present invention. Steps 51 through 54 correspond to steps 41 through 44 according to FIG. 4. According to the second refinement of the present invention, a verified future course range $KB_{ver}$ is then determined in step 55. For this purpose, according to 56, further measuring data, particularly a future course range $KB_2$ determined in another way, are used. For example, this otherwise determined future course range $KB_2$ can be determined on the basis of the methods known from the related art, with the aid of a yaw rate or a transverse acceleration. By linking a plurality of future course ranges, ascertained independently of one another, an error rate existing in each case is further minimized. In the simplest case, the two determined future course ranges KB and $KB_2$ are linked, such that the first determined course range KB is used as long as a fixed minimal number of preceding-traveling vehicles is detected. If fewer preceding-traveling vehicles than this fixed number are detected, future course range $KB_2$ is used. Alternatively, the data of both determined course ranges KB and $KB_2$ can also be correlated with one another to obtain verified course range $KB_{ver}$. According to 58, the future verified course range is also determined iteratively. Step 57 corresponds to step 46 of FIG. 4 and again includes an object selection of a preceding-traveling vehicle within the framework of an adaptive travel speed and proximity control.

Figure 6:
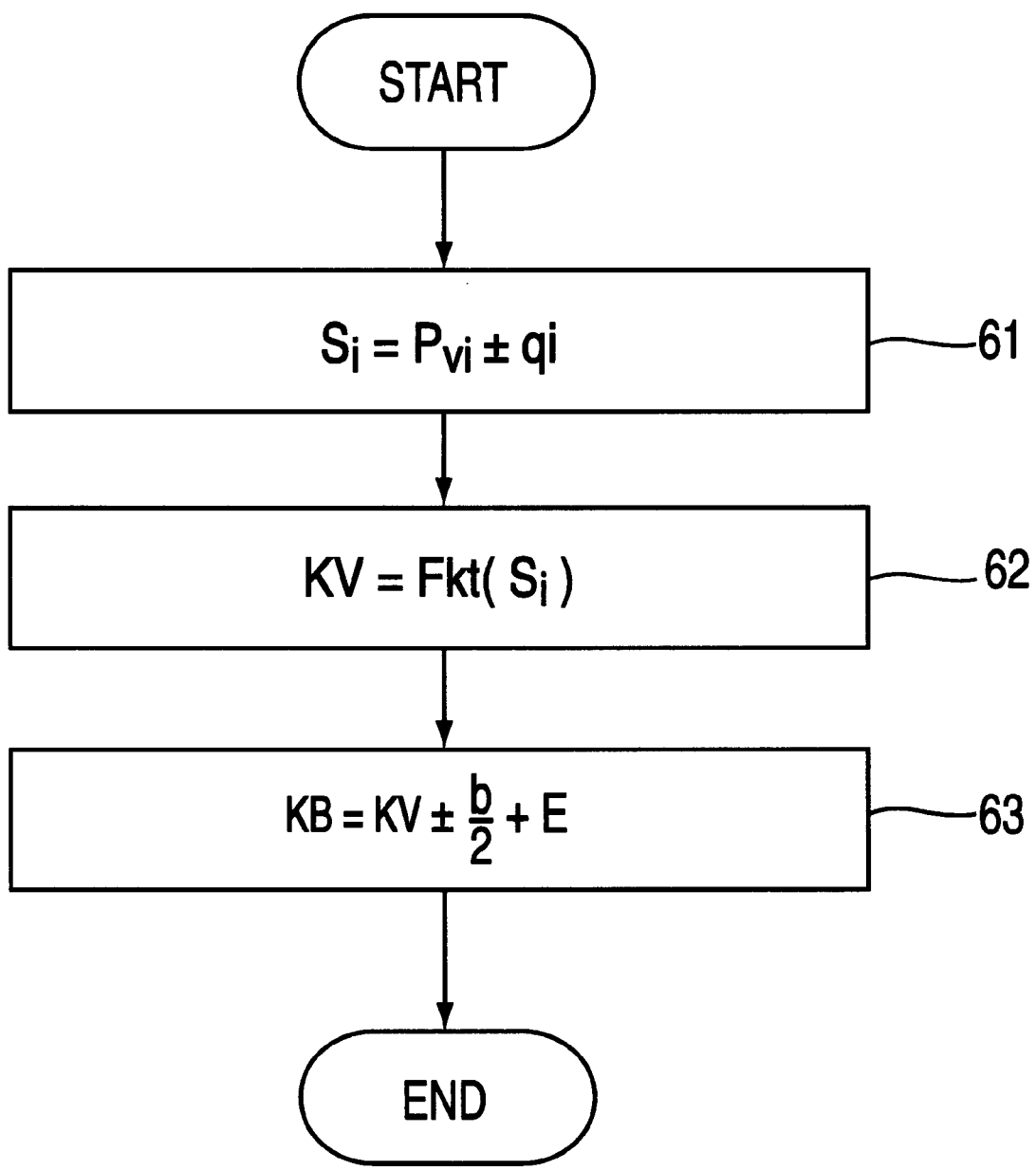
FIG. 6 shows a flow chart for the detailed clarification of the method of the present invention.

FIG. 6 shows a detailed representation of the method steps for determining future course range KB according to steps 44 and 54 of FIGS. 4 and 5. Accordingly, steps 61 through 63 can be inserted in place of steps 44 and 54 in FIGS. 4 and 5. In step 61, reference points $S_i$ are determined by setting off positions $P_{vi}$ of detected preceding-traveling vehicles $F_{vi}$ against the associated determined lateral offsets $q_i$. In the ideal case, all the ascertained reference points $S_i$ then lie on a curve which corresponds to future course progression KV of the first vehicle. This course progression KV is ascertained in step 62, in that a function is ascertained, for example in the form of a polynomial, which, to the greatest extent possible, includes all the reference points $S_i$ at least approximatively. This determined function then describes future course progression KV. In step 63, future course range KB is then determined, in that course progression KV is expanded by width b of the first vehicle. In addition, optionally, a further expansion E is preferably effected as a function of detected lane-change signals of the first vehicle.

What is claimed is:

1. A method for determining a future travel-course range of a first vehicle equipped with a proximity sensor, comprising the steps of:

using the proximity sensor, determining at least two relative positions of one preceding-traveling vehicle with respect to the first vehicle;

ascertaining lateral offsets between the preceding-traveling vehicle and the first vehicle on the basis of the at least two relative positions;

ascertaining a future course range of the first vehicle as a function of a course progression of the preceding-traveling vehicle;

forming the course progression of the preceding-traveling vehicle from the at least two determined relative positions of the preceding-traveling vehicle;

forming reference points as a function of lateral offsets and of the course progression of the preceding-traveling vehicle;

determining a function, corresponding to a future course progression of the first vehicle, which includes essentially all of the reference points; and expanding the future course progression of the first vehicle by a predetermined width, yielding the future course range of the first vehicle.

2. The method according to claim 1, further comprising the steps of:

determining a relative position of the preceding-traveling vehicle with respect to the first vehicle;

based on the relative position, determining a lateral offset between the preceding-traveling vehicle and the first vehicle; and determining the future course range of the first vehicle as a function of the lateral offset and the course progression of the preceding-traveling vehicle.

3. The method according to claim 2, further comprising the steps of:

re-determining the lateral offset at predetermined instants; and assuming that the lateral offset is constant between the predetermined instants.

4. The method according to claim 1, further comprising the steps of:

determining the future course range on the basis of course progressions of a plurality of preceding-traveling vehicles; and isolating a travel-lane change of an individual preceding-traveling vehicle by one of a comparison, a correlation and an average of the course progressions of the plurality of preceding-traveling vehicles.

5. The method according to claim 1, further comprising the steps of:

determining at least one further future course range of the first vehicle on the basis of at least one of a steering angle, a steering-wheel angle, a yaw rate, a difference of wheel speeds, a transverse acceleration, stationary objects, and oncoming vehicles detected by the proximity sensor; and ascertaining a verified future course range as a function of the future course range and the at least one further future course range.

6. The method according to claim 1, further comprising the steps of:

limiting the future course range on the basis of positions of at least one of: detected stationary objects and detected oncoming vehicles.

7. A device comprising:

a proximity sensor for determining at least two relative positions of one preceding-traveling vehicle with respect to a first vehicle;

an evaluation device for ascertaining at least an angle, a distance and a speed of the one preceding-traveling vehicle;

means for ascertaining lateral offsets between the preceding-traveling vehicle and the first vehicle on the basis of the at least two relative positions;

means for ascertaining a future course range of the first vehicle as a function of a course progression of the preceding-traveling vehicle;

means for forming the course progression of the preceding-traveling vehicle from the at least two determined relative positions of the preceding-traveling vehicle;

means for forming reference points as a function of lateral offsets and of the course progression of the preceding-traveling vehicle;

means for determining a function, corresponding to a future course progression of the first vehicle, which includes essentially all of the reference points; and means for expanding the future course progression of the first vehicle by a predetermined width, yielding the future course range of the first vehicle.

* * * * *